United States Patent
Guzan

Patent Number: 5,503,090
Date of Patent: Apr. 2, 1996

[54] DRY GRANULAR FERTILIZER ROOT FEEDER

[76] Inventor: Donald A. Guzan, 2 Beechwood Ct. West, Buffalo Grove, Ill. 60089

[21] Appl. No.: 36,919

[22] Filed: Mar. 25, 1993

[51] Int. Cl.$^6$ ..................... B67D 5/64
[52] U.S. Cl. ............. 111/7.2; 222/547; 222/548; 222/566; 224/269
[58] Field of Search ................ 239/152, 153, 239/154, 588; 222/175, 548, 547, 566; 111/127, 7.1, 7.2, 7.3, 95, 92, 94; 224/269; 15/327.5, 405

[56] References Cited

U.S. PATENT DOCUMENTS

| | | | |
|---|---|---|---|
| 163,526 | 5/1875 | Ramsey | 239/153 |
| 260,373 | 7/1882 | Erwin . | |
| 337,312 | 3/1886 | Dodds . | |
| 468,870 | 2/1892 | Griswold | 222/566 X |
| 797,531 | 8/1905 | Peters . | |
| 1,475,600 | 11/1923 | Schling | 222/566 X |
| 1,755,445 | 4/1930 | Irish | 111/7.1 X |
| 2,288,101 | 6/1942 | Mayer | 222/566 X |
| 2,348,205 | 5/1944 | Chater . | |
| 2,430,147 | 11/1947 | Stephenson | 222/566 X |
| 2,539,271 | 1/1951 | Rianda . | |
| 2,599,118 | 6/1952 | McMillan . | |
| 2,670,105 | 2/1954 | Huhn | 222/547 X |
| 2,748,996 | 6/1956 | Fritschi, Jr. | 222/547 X |
| 3,077,292 | 2/1963 | Gehrke | 224/269 X |
| 3,118,402 | 1/1964 | Nelson . | |
| 3,933,308 | 1/1976 | Bradley et al. | 239/10 |
| 4,443,149 | 4/1984 | Isaacson | 414/326 |
| 4,682,550 | 7/1987 | Joy | 111/7.1 |
| 4,807,545 | 2/1989 | Joy | 111/7.1 |
| 4,934,287 | 6/1990 | Guin et al. . | |
| 4,995,327 | 2/1991 | Jeffers, Sr. . | |
| 5,170,729 | 12/1992 | Benner | 111/7.2 |
| 5,176,303 | 1/1993 | Franke | 239/152 X |
| 5,267,371 | 12/1993 | Solek et al. | 15/327.5 |
| 5,339,994 | 8/1994 | Nuila | 222/175 |

FOREIGN PATENT DOCUMENTS

| | | | |
|---|---|---|---|
| 16469 | 10/1929 | Australia | 111/7.1 |
| 509672 | 11/1920 | France | 111/7.1 |
| 992758 | 10/1951 | France | 111/7.1 |

*Primary Examiner*—David H. Corbin
*Assistant Examiner*—Christopher J. Novosad
*Attorney, Agent, or Firm*—Patula & Associates

[57] ABSTRACT

A portable fertilizer root feeder for fertilizing plants which fertilizer root feeder operates on the principle of gravity and positioning of an applicator tube in order to regulate the flow of the fertilizer. The fertilizer root feeder includes a portable tank with a hose extension, a frame which supports the tank and which tank may be strapped to an operator's back for transport of the tank and a T-stake for making a hole in an area about plant roots such that the hose extension may be placed within the hole to deposit fertilizer. The invention operates without any mechanical parts and operates based on the principles of gravity.

20 Claims, 4 Drawing Sheets

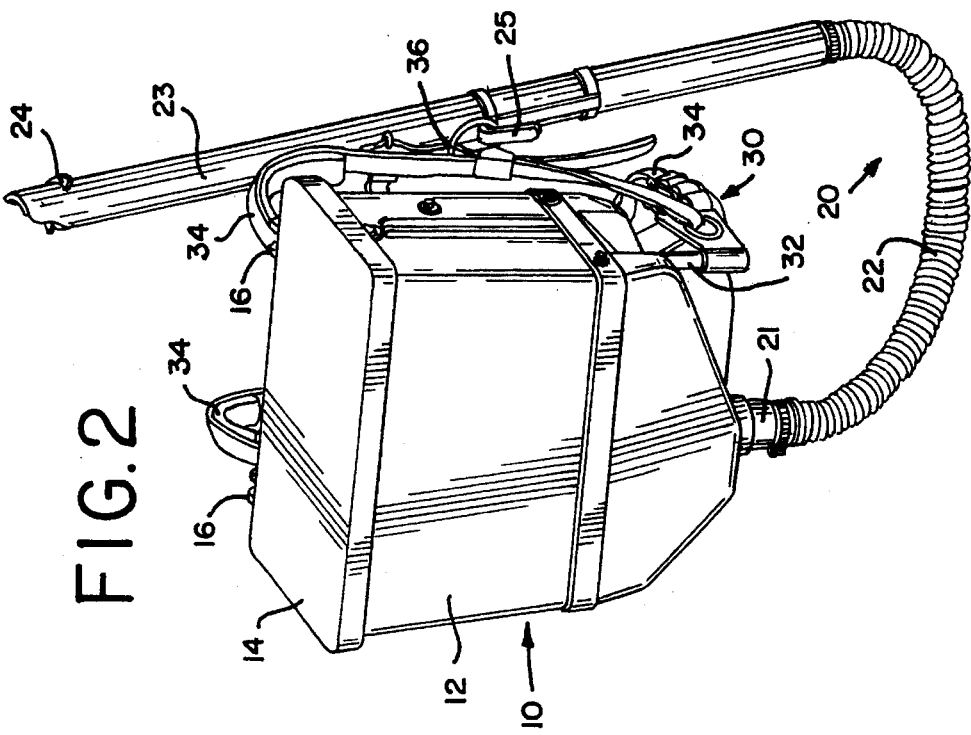
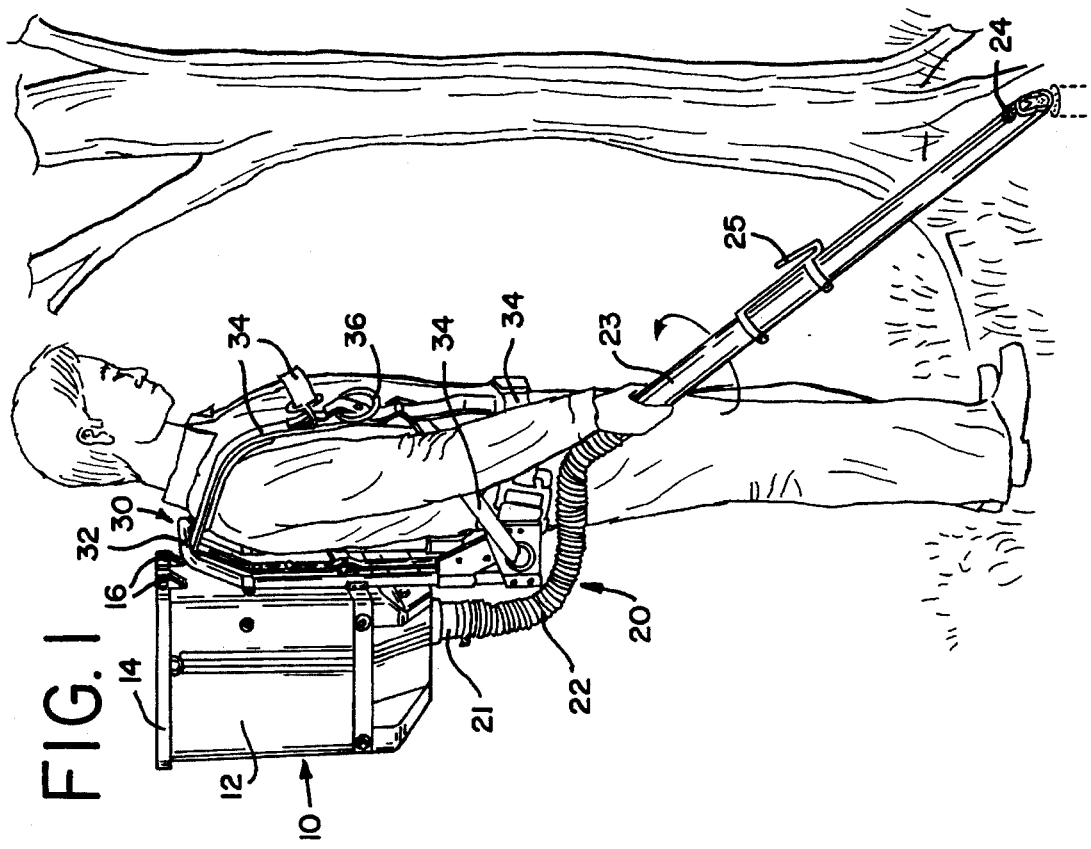

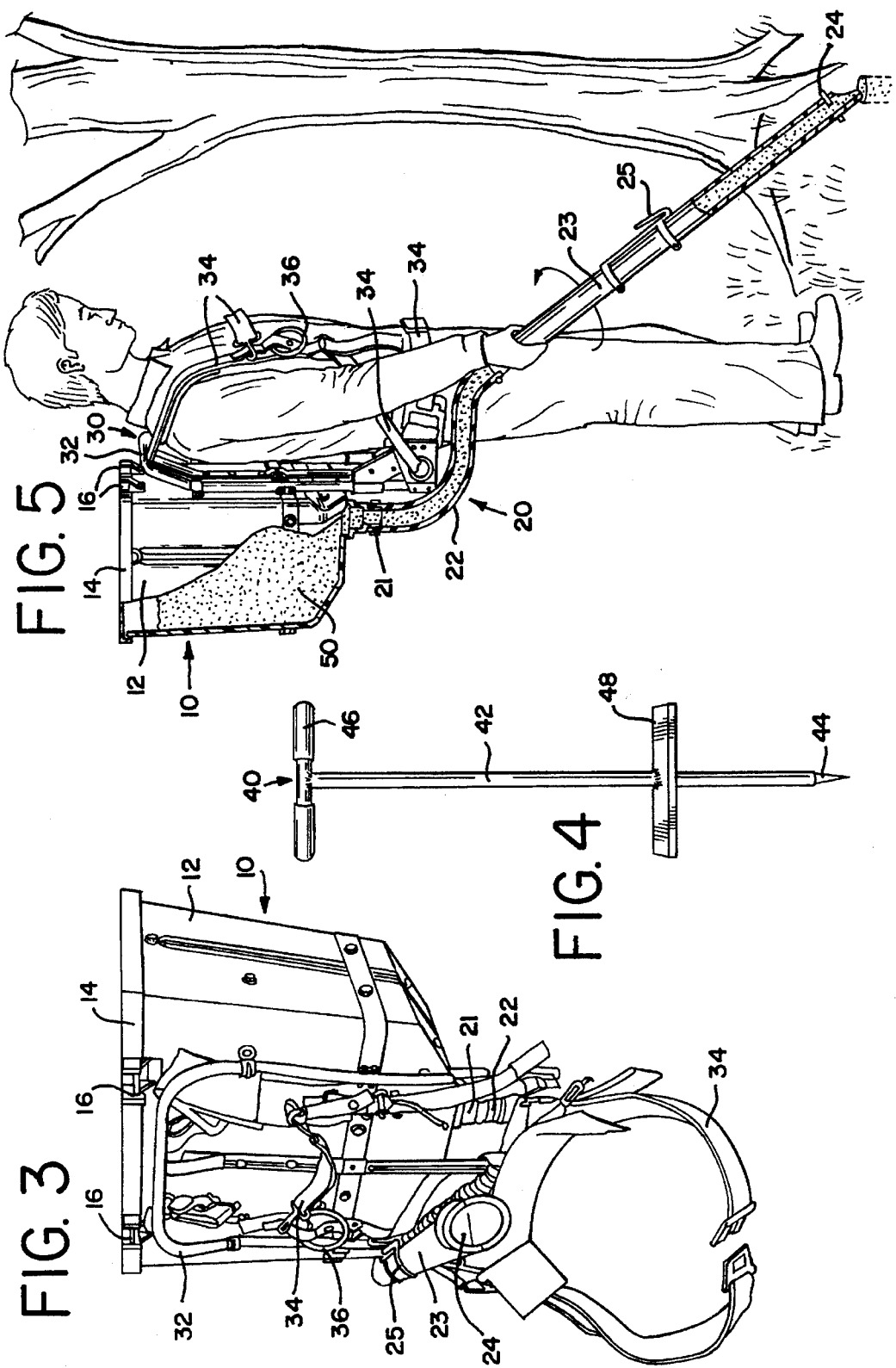

DRY GRANULAR FERTILIZER ROOT FEEDER

This invention relates to a fertilizing device, and in particular, a novel device for fertilizing the deep roots of plants, such as trees and shrubs, with dry granular fertilizer.

BACKGROUND OF THE INVENTION

In farming or gardening situations, there is an obvious need to fertilize plants to help them grow. Various apparatuses are used to achieve such fertilization. Previous fertilizing apparatuses constitute two main groups: (1) those apparatuses which distribute fertilizer on the ground surface and; (2) those apparatuses which introduce fertilizer beneath the ground surface. Regarding group (1), the plant roots are what absorbs the nutrients in the fertilizer. By distributing the fertilizer on the ground surface about the plant, the fertilizer is exposed and most of the fertilizer is blown away by wind, washed away by rain or trod upon and carried away by animals or humans before the plant roots can absorb the nutrients in the fertilizer. As such, the process of surface fertilization becomes ineffective in that the fertilizer never remains on the ground long enough for the plant to absorbed the nutrients within the fertilizer.

Regarding group (2), when fertilizer is introduced beneath the ground surface this usually entails messy liquid fertilizers. The prior known apparatuses dispensing the fertilizer into the ground release the fertilizer by one or more valves which control the flow of the fertilizer. Such underground fertilizer apparatuses usually are required to be left in the ground. By leaving the apparatuses in the ground, hazards are created to both people and the apparatuses. Persons may accidentally run into these apparatuses injuring themselves or breaking the apparatuses. Further, having a fertilizing apparatus protruding from the ground by every tree and shrub or at varied intervals along a lawn is aesthetically unappealing. Though somewhat effective, these types of fertilizing apparatuses create more detriments then benefits.

Finally, one common factor among the different types of fertilizing apparatuses is the prevalence of mechanics used for operating the fertilizing devices. By virtue of the fact that these mechanical devices have moving parts, they are subject to the corrosive effects of the fertilizer, malfunction, break down, wear and rust, rendering the entire apparatus inoperable.

The present invention avoids the problems of ineffective fertilization methods created by ground surface fertilization. The present invention only deposits fertilizer beneath and up to the ground surface. The fertilizer is not fully exposed and it is introduced closer to deeper roots avoiding loss of the fertilizer to outside elements and making absorption of the fertilizer by the plant, tree or shrub easier. Further, the present invention is intended primarily for dry fertilizer avoiding the mess of liquid fertilizers and making the amount of fertilizer introduced beneath the ground surface more easy to control. However, liquids or part liquid/solid fertilizers may also be utilized.

To operate the present invention, a small hole is made in the ground with a T-stake and the fertilizer is deposited within this hole. The hole is made usually at the point of the drip line of a tree or shrub. When an operator of the present invention has completed the fertilization process, the present invention is stored away. Only the holes remain which due to their small size do not present any danger, i.e., a person or child getting their foot caught in a hole. The present invention is not left in the ground to create hazards to people or to become damaged by the elements, animals or people. Additionally, the invention is not left in the ground presenting an aesthetically unappealing site. Only a small hole is left which after a few days begins to close as the fertilizer is absorbed by the plant roots.

The present invention works on the principle of gravity; wherein an applicator tube must be positioned with its open end facing the ground. The applicator tube is flowably connected to a tank containing fertilizer. When the applicator tube is positioned with its open end facing the ground, the fertilizer flows from the tank to the open end of the applicator tube; however, a baffle is located in the end of the tube to regulate the flow of the fertilizer. To release the fertilizer while the applicator tube is facing the ground, the applicator tube and consequentially the baffle must rotated such that the baffle does not hinder the flow of fertilizer out the open end of the tube.

There is no known prior art device which encompasses all the attributes of the present invention. For example, U.S. Pat. No. 4,934,287 to Guin, et al. and U.S. Pat. No. 3,118,402 to Nelson disclose apparatuses for injecting substances beneath the ground surface. Guin's apparatus is used with plant nutrients and Nelson's apparatus is used with weed killers. Each apparatus is portable but has at least one valve-actuated member for controlling the amount of substance injected beneath the ground surface. The novelty of the present invention is the absence of any moving implements for dispensing fertilizer beneath the ground surface.

U.S. Pat. No. 2,539,271 to Rianda and U.S. Pat. No. 4,995,327 to Jeffers, Sr. disclose apparatuses for dispensing solid materials into the ground. Rianda's apparatus, used for finding gopher holes, has a tubular shell and an interior removable rod. Rianda's apparatus is used to make a small hole in the ground, after which the interior rod is removed leaving the shell which defines a passage between the ground surface and the gopher tunnel and through which poison to kill the gopher may be introduced. In addition, unlike Rianda's apparatus, an operator of the present invention need not stoop to dispense the fertilizer, but may remain in an upright position.

Jeffers' apparatus discloses a planar support tray having an attached funnel and a conduit flowably attached to the funnel. The purpose of Jeffers is to aid in the planting of seeds by positioning the conduit on the ground where planting is desired and dropping the seeds into the funnel and through the conduit. The present invention is a high-capacity closed system fertilizer dispenser which allows an operator to distribute the fertilizer without having to come into contact with the fertilizer beyond the initial need to fill the invention with fertilizer.

U.S. Pat. No. 797,531 to Peters discloses an apparatus for transplanting and depositing liquid on plants. Peters' apparatus comprises one unit for forming an opening in the ground in which to place a plant and then depositing liquid over the plant by the manipulation of an actuated valve member. The present invention makes a small hole not large enough to accommodate a plant into which hole fertilizer is deposited without the aid of moving implements such as an actuated valve.

BRIEF SUMMARY OF THE INVENTION

The present invention is a novel device for fertilizing plants with dry granular fertilizer and based on the principle of gravity.

The present invention comprises a fertilizer storage tank, a hose extension attached to the tank, an applicator tube attached to the hose extension and including a baffle at an end thereof, a means for supporting and portably transporting the tank and a means for making a hole into which the hose extension is placed in order to deposit fertilizer within the hole.

The primary objective of the present invention is to provide a novel device for fertilizing plants with dry granular fertilizer based on the principle of gravity.

It is a further object of the present invention to improve fertilization for the deep roots of trees and shrubs.

It is a further object of the present invention to provide a simple means for fertilizing.

It is a further object of the present invention to provide a means for fertilizing which has no mechanically moving parts, thereby eliminating break downs of the device as a result of mechanical moving parts.

It is a further object of the present invention to provide a large capacity, portable fertilizer feeder.

It is a further object of the present invention to provide a closed system from the point of tank refill to the point of fertilizer discharge.

Numerous other advantages and features of the invention will become readily apparent from the detailed description of the preferred embodiment of the invention, from the claims and from the accompanying drawings, in which like numerals are employed to designate like parts throughout the same.

BRIEF DESCRIPTION OF THE DRAWINGS

A fuller understanding of the foregoing may be had by reference to the accompanying figures, wherein:

FIG. 1 is a side perspective view of the tank part of the present invention;

FIG. 2 is a back perspective view of the tank part of the present invention;

FIG. 3 is a front perspective view of the tank and hose extension of the present invention;

FIG. 4 is a front view of the T-stake;

FIG. 5 is a partial cut-away side perspective view of the tank part of the present invention;

DETAILED DESCRIPTION OF THE PREFERRED EMBODIMENT OF THE PRESENT INVENTION

Figure 6:
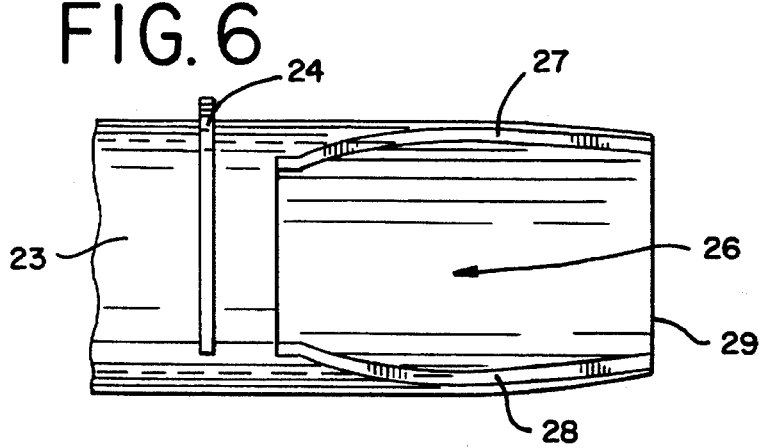
FIG. 6 is a top plan view of the depositing end of the applicator tube of the present invention.

While the invention is susceptible of embodiment in many different forms, there is shown in the drawings and will be described in detail, a preferred embodiment of the invention. It should be understood, however, that the present disclosure is to be considered an exemplification of the principles of the invention and is not intended to limit the spirit and scope of the invention and/or claims of the embodiment illustrated.

Referring now to the drawings, FIG. 1 illustrates a side perspective view of the tank part 10 of the invention being used by a person. The tank part 10 comprises a containing portion 12 and a lid 14 hingeably attached by hinges 16 to the containing portion 12. A hose extension 20 is attached to the containing portion 12. The hose extension 20 comprises a hollow tube extension 21, a flexible hose 22 attached to the tube extension 21 and a rigid applicator tube 23 attached to the flexible hose 22, such that the containing portion 12 and the hose extension 20 are all in flowable communication with each other. The rigid applicator tube 23 has a baffle 24 attached to the end of the applicator tube 23 furthest from the containing portion 12. A hook 25 is attached to the applicator tube. A means 30 for supporting and portably transporting the tank part 10 is attached to the containing portion 12 of the tank 10. The means 30 for supporting and portably transporting the tank part 10 comprises a frame 32 and a series of flexible straps 34 for attaching the tank part 10 about the torso and shoulders of a person operating the invention. A ring 36 is attached to the flexible straps 34 for hooking the applicator tube 23 by the hook 25 to the means 30 for supporting and portably transporting the tank part 10 when the applicator tube 23 is not in use.

FIG. 2 illustrates a back perspective view of the tank part 10 of the invention. Tank part 10 includes containing portion 12, lid 14, hinges 16, extension 21, hose 22, and tube 23 with baffle 24. Tank part 10 is attached to means 30 for supporting and portably transporting tank part 10. Means 30 includes frame 32, straps 34, and ring 36. Tube 23 is shown connected to ring 36 by hook 25 for storage purposes when tube 23 is not in use.

FIG. 3 illustrates a front perspective view of the tank part 10 of the invention. Tank part 10 includes containing portion 12, lid 14, hinges 16, extension 21, hose 22, and tube 23 with baffle 24 and hook 25. Tank part 10 is attached to means 30 for supporting and portably transporting tank part 10. Means 30 includes frame 32, straps 34, and ring 36. Straps 4 include two shoulder straps, a chest strap and a belt strap. Straps 34 are suitably connectable and adjustable by conventional means.

FIG. 4 illustrates the means for making a hole. The means 40 comprises a shaft 42 with a piercing end 44, a handle 46 attached perpendicularly to the shaft 42 opposite the piercing end 44 and a foot rest 48 attached perpendicularly to the shaft 42 between the handle 46 and the piercing end 44.

FIG. 5 illustrates a partial cut-away side perspective view of the tank part 10 of the invention being used by a person. Tank part 10 includes containing portion 12, lid 14, hinges 16, extension 21, hose 22, and tube 23 with baffle 24 and hook 25. Tank part 10 is shown filled with fertilizer 50. Fertilizer 50 flows from body 12, through extension 21 into hose 22 and tube 23. If baffle 24 is in an open position, fertilizer 50 will exit tube 23. If baffle 24 is in a closed position, the fertilizer 50 will abutt baffle 24 and be prevented from exiting tube 23.

FIG. 5 further shows tank part 10 attached to means 30 for supporting and portably transporting tank part 10. Means 30 includes frame 32, straps 34, and ring 36.

FIG. 6 illustrates a top plan view of the end of the applicator tube 23 furthest from the containing portion 12 wherein a cut away portion 26 is defined by the side walls 27 and 28, and an end 29, of the applicator tube 23 and the baffle 24 is fixed in the applicator tube behind the cut away portion 26.

Figure 7:
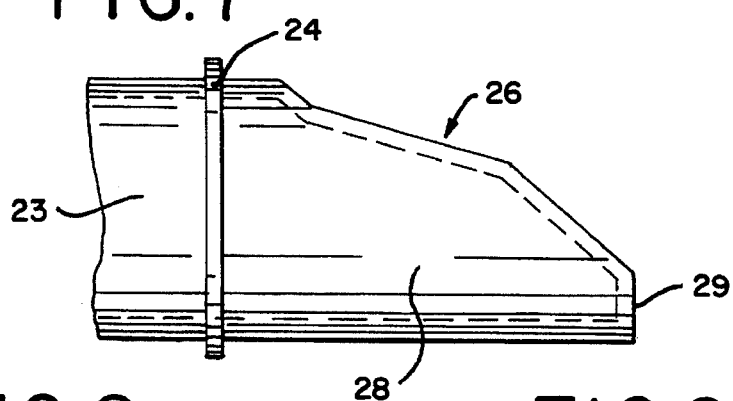
FIG. 7 is a side plan view of the depositing end of the applicator tube.

FIG. 7 illustrates a side plan view of the end of the applicator tube 23 furthest from the containing portion 12 which applicator tube 23 defines a cut away portion 26 and in which applicator tube 23 a baffle 24 is fixed. As can be seen, side walls 27 (not shown) and 28 of cut away portion 26 are sloped at three different angles from the top of tube 23 to the end 29. The specialized and novel shape of cut away portion 26 allows the end of tube 23 to be used as a type of funnel which, when placed at or partially into a hole created by means 40, allows fertilizer to be selectively and precisely deposited into the hole. The cut-away portion 26 configured in the specialized manner depicted in the figures so as to afford a good flow rate of fertilizer and to insure no waste of the fertilizer into the hole. This is a significant improvement in the art of such devices.

Figure 8:
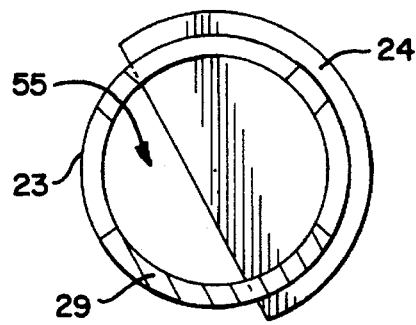
FIG. 8 is a front plan view of the depositing end of the applicator tube in an open position.

FIG. 8 illustrates a front plan view of the end of the applicator tube 23 furthest from the containing portion 12 in which applicator tube 23 a fixed or non-moving baffle 24 is positioned. FIG. 8 illustrates the applicator tube 23 in an open position. As can be seen, baffle 24 is preferably a rigid semi-circular member having a diameter slightly larger than the diameter of tube 23. Baffle 24 is affixed in tube 23 and forms a wall therein which blocks at least half of the tube's 23 passageway, while at the same time providing a small opening 55 in the passageway through which fertilizer may pass. Baffle 24 is oriented in tube 23 such that when a tangent to the center of end 29 of cut away portion 26 is perpendicular to a level ground surface, fertilizer 50 is free to pass through opening 55 due to the force of gravity. When the baffle 24 is reversed, fertilizer cannot pass through the tube's 23 passageway.

Figure 9:
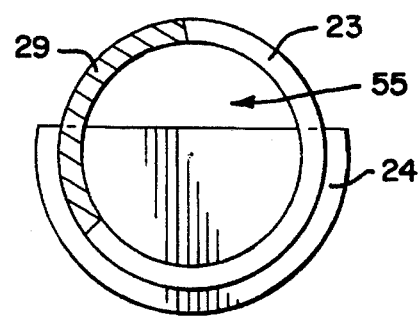
FIG. 9 is a front plan view of the depositing end of the applicator tube in a closed position.

FIG. 9 illustrates a front plan view of the end of the applicator tube 23 furthest from the containing portion 12 in which applicator tube 23 a baffle 24 is fixed. FIG. 9 illustrates the applicator tube 23 in a closed position. When applicator tube 23 is rotated by an operator to the closed position shown in FIG. 9, baffle 24 acts as a barrier to fertilizer 50 since opening 55 is now at the top of tube 23. Baffle 24, in closed position, blocks enough of the passageway of tube 23 such that when tube 23 is held at a proper fertilizing angle (as in FIGS. 1 and 5), no fertilizer will pass through opening 55.

Figure 10:
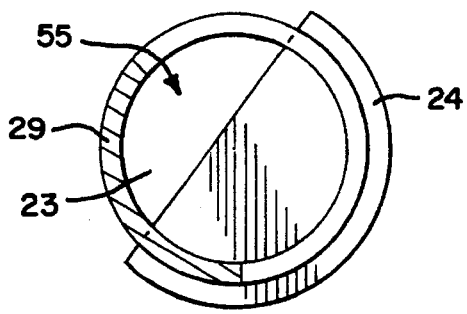
FIG. 10 is a front plan view of the depositing end of the applicator tube in a partially open position.

FIG. 10 illustrates a front plan view of the end of the applicator tube 23 furthest from the containing portion 12 in which applicator tube 23 a baffle 24 is fixed. FIG. 10 illustrates the applicator tube 23 in a partially open position. The present invention allows a user to select the rate the fertilizer 50 is deposited by rotating tube 23 between closed and opened position. As can be seen, a small amount of fertilizer will pass through opening 55 when applicator tube 23 is in a partially opened position, as opposed to a greater amount when fully opened.

Figure 11:
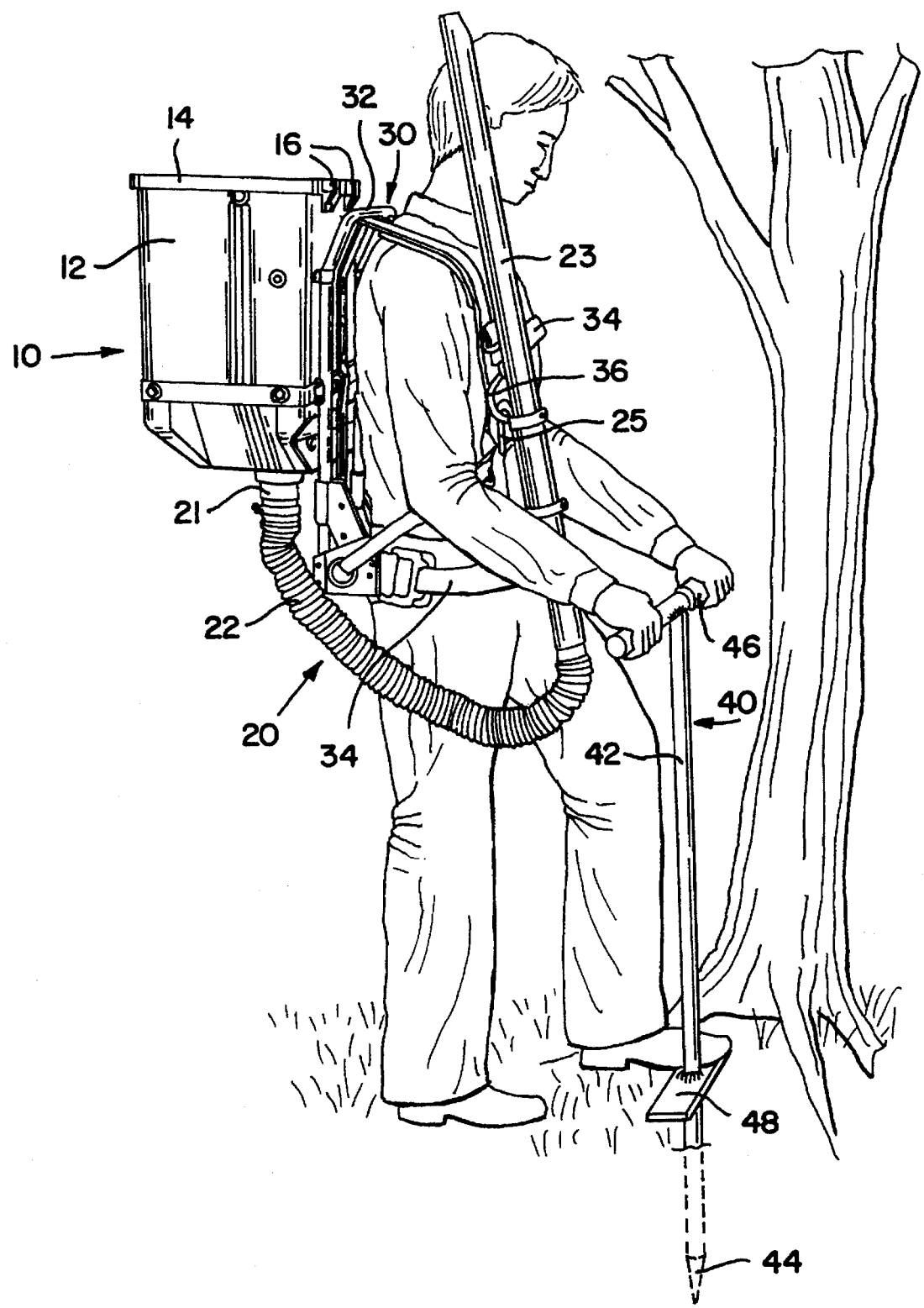
FIG. 11 is a side perspective view of the present invention.

FIG. 11 illustrates a side perspective view of the invention being used by a person, wherein the means 40 comprises a shaft 42 with a piercing end 44, a handle 46 attached perpendicularly to the shaft 42 opposite the piercing end 44 and a foot rest 48 attached perpendicularly to the shaft 42 between the handle 46 and the piercing end 44. The person using the invention grasps the handle 46 of the means 40 and places his or her foot on the foot rest 48 exerting pressure such that the piercing end 44 pierces the ground making a small hole the girth of the shaft. The tank part 10 of the invention comprises a containing portion 12 and a lid 14 hingeably attached by hinges 16 to the containing portion 12. A hose extension 20 is attached to the containing portion 12. The hose extension comprises a hollow tube extension 21, a flexible hose 22 attached to the tube extension 21 and a rigid applicator tube 23 attached to the flexible hose 22, such that the containing portion 12 and the hose extension are all in flowable communication with each other. The rigid applicator tube 23 has a baffle 24 attached to the end of the applicator tube 23 furthest from the containing portion 12. A hook 25 is attached to the applicator tube. A means 30 for portably transporting the tank part 10 is attached to the containing portion 12 of the tank part 10. The means 30 for portably transporting the tank part 10 comprises a frame 32 and a series of flexible straps 34 for attaching the tank about the torso and shoulders of a person operating the invention. A ring 36 is attached to the flexible straps 34 for hooking the applicator tube 23 by the hook 25 to the means 30 for portably transporting the tank part 10 when the applicator tube 23 is not in use.

To operate the invention, a person places the tank part 10 on his or her back securing the containing portion 12 to his back by placing the flexible straps 34 of the means 30 for portably transporting the tank part 10 about his shoulders and torso. It is intended that other supporting means may be utilized to support the containing portion 12. The person using the invention then grasps the handle 46 of the means 40 and places his or her foot on the foot rest 48 exerting such pressure such that the piercing end 44 pierces the ground at or near the desired plant to be fertilized, making a small hole the girth of the shaft 42. The person using the invention then removes the applicator tube 23 from the ring 36 and points the end of the tube furthest from the containing portion 12 into the hole. By rotating the applicator tube 23 by the turn of the operator's wrist clockwise, the applicator tube 23 is place in an open position (FIG. 8) with a cut-away at the front closest to the operator and allows the granular fertilizer to flow from the containing portion 12 through the hose extension 20 into the hole. By rotating the applicator tube 23 counterclockwise, the flow of the fertilizer is stopped by baffle 24 (FIG. 9). The operator can continue to the next hole or tree, etc.

It is to be understood that the embodiments herein described are merely illustrative of the principles of the present invention. Various modifications may be made by those skilled in the art without departing from the spirit or scope of the claims which follow.

I claim:

1. A portable device for dispensing granular fertilizer to roots of vegetation, said device comprising:

(a) containing means for storing granular fertilizer;

(b) a dispensing hose extension attached to said containing means for selectively dispensing said granular fertilizer, said hose extension having a baffle fixedly mounted therein in a fixed position relative to said hose extension, said granular fertilizer in flowable communication therebetween said containing means and said hose extension; and (c) a means for supporting and portably transporting said containing means.

2. The device of claim 1, wherein said containing means comprises:

(a) a tank having a containing portion; and (b) a lid hingeably attached to said containing portion and allowing air flow through said tank.

3. The device of claim 2 wherein said containing portion has a fill end and an exit end in which said exit end defines an aperture and which said exit end is directly opposite said fill end, said containing portion gradually decreasing in width nearer to and appropriate at the exit end such that when filled with fertilizer, gravity causes the fertilizer to migrate to said exit end and out said aperture.

4. The device of claim 1, wherein said dispensing hose extension comprises:

(a) a hollow tube extension on said tank, the fertilizer in flowable communication therebetween said tank and said hollow tube extension;

(b) a flexible hose attached to said hollow tube extension, the fertilizer in flowable communication therebetween said flexible hose and said hollow tube extension;

(c) a rigid applicator tube attached to said hose, said rigid applicator tube receiving said baffle for controlling the flow of the fertilizer, said applicator tube in flowable communication therebetween said tank and said hose; and (d) a hook means attached to the tube for hooking the tube to the means for supporting and portably transporting the tank when said tube is not in use.

5. The device of claim 1, wherein the means for supporting and portably transporting said containing means further comprises:

(a) a frame attached to containing means;

(b) flexible straps attached to the frame which straps are used to fasten said containing means to an operator thereby allowing for transport of said containing means; and (c) a ring attached to the flexible straps for receiving said hose extension to hold said hose extension when said hose extension is not in use.

6. A portable device for dispensing granular fertilizer to roots of plants beneath ground surface and the fertilizer flow operating on the principle of gravity, comprising:

(a) a tank having a containing portion for storing fertilizer with a hingeably attached lid allowing the flow of air through said tank to facilitate the flow of the fertilizer;

(b) a dispensing hose extension attached to said tank, the fertilizer in flowable communication between said tank and said dispensing hose extension;

(c) means for selectively allowing for a continuous flow of fertilizer when said hose extension is in use upon rotational movement of said dispensing hose extension; and (d) means for supporting and portably transporting said tank, said means including a frame attached to the containing portion of said tank, a plurality of flexible straps for attaching said tank over each shoulder, around a torso and around a waist of an operator.

7. The device of claim 6, wherein said containing portion has a fill end and an exit end opposite said fill end, said exit end defining an aperture, the containing portion gradually decreasing in width at said exit end to create a continuous flow of fertilizer within said tank until such time as said tank empties.

8. The device of claim 6 wherein said dispensing hose extension comprises a hollow tube extension, said fertilizer in flowable communication with said containing portion and said hollow tube extension, a flexible hose, said fertilizer in flowable communication with said hollow tube extension and the flexible hose, and a rigid applicator tube having a depositing end, said fertilizer in flowable communication with said flexible hose and said rigid applicator tube, said rigid applicator tube including said means for selectably allowing for a continuous flow of fertilizer.

9. The device of claim 8 wherein said applicator tube has a hook for hooking said tube to the means for supporting and portably transporting said tank when the tube is not in use.

10. The device of claim 8, wherein said applicator tube has a depositing end, two lateral sides, a top side and a bottom side having an interior, said top side and a portion of the lateral sides are cut away at said depositing end such that the interior of said bottom side is exposed, said lateral sides define a gradual grade from said top side to said bottom side, the cut away portion forming a guide in the depositing end of said tube to guide the fertilizer from said tube.

11. The device of claim 10, wherein said means for selectively allowing is a baffle affixed in said tube near the depositing end such that the baffle controls the flow of fertilizer when said tube is in use, said tube being rotated clockwise from the operator's perspective to initiate flow of the fertilizer and said tube being rotated counter-clockwise from the operator's perspective to cease flow of the fertilizer.

12. The device of claim 11, wherein the baffle is a semi-circular member and is affixed in said tube such that when the guide of said tube is parallel to a ground area, a flat edge of said semi-circular member is approximately at a 45° angle to the ground area.

13. A method for fertilizing the deep roots of plants using a fertilizer root feeder having a tank with a hose extension which has a rigid applicator tube, the applicator tube having a depositing end with a guide and a baffle fixed in the depositing end, a means for making a hole in which hole the depositing end of the applicator tube is placed in order to deposit fertilizer into the hole, the tank being supported by a means for supporting and portably transporting the tank to which means a ring is attached, which ring supports the applicator tube when the tube is not in use, the method for using the fertilizer root feeder comprising the steps of:

(a) strapping the tank of the fertilizer root feeder on an operator's back by the means for supporting and portably transporting the tank;

(b) making a hole with the means for making a hole;

(c) disengaging the rigid applicator tube from the ring;

(d) positioning the applicator tube so that it is touching and concerning the hole and such that the baffle is in a closed position;

(e) rotating the applicator tube clockwise from an operator's perspective such that the guide is touching and concerning the hole and the baffle is in an open position in order to initiate flow of the fertilizer from the tank through the hose extension and out the depositing end of the tube in order that fertilizer may be deposited within the hole;

(f) filling the hole with fertilizer;

(g) rotating the applicator tube counter-clockwise from an operator's perspective such that the baffle is in a closed position in order to cease flow of the fertilizer from the tank through the hose extension and out the depositing end of the tube; and (h) moving to a new position among the plant roots to repeat steps (a) through (g) as many times as desired.

14. The method described in claim 13, wherein the step of strapping the tank by the means for supporting and portably transporting comprises:

(a) attaching a frame to a containing portion of the tank;

(b) attaching flexible straps to the frame which straps are used to fasten the tank to an operator thereby allowing for transport of the fertilizer root feeder; and (c) attaching a ring to the flexible straps such that the hook on the applicator tube may be hooked to the ring to hold the tube when the tube is not in use.

15. The method described in claim 13, wherein the step of making a hole with the means for making a hole comprises:

(a) providing a shaft having a handle end and a piercing end opposite the handle end, the piercing end being contoured and pointed to facilitate making holes in an area about a plant;

(b) grasping a handle attached perpendicularly to the handle end of the shaft; and (c) applying pressure to a foot rest attached perpendicularly to the shaft.

16. A method for fertilizing the deep roots of plants using a fertilizer root feeder said root feeder having a tank for storing fertilizer, a hose extension on said tank and having a rigid applicator tube, the applicator tube having a depositing end with cut away portion and a baffle fixed in the depositing end, a means for making a hole and having a shaft, the shaft having a handle end and a piercing end opposite the handle end, a handle attached perpendicularly to the handle end of the shaft, and a foot rest attached perpendicularly to the shaft, the piercing end being pointed to facilitate making holes in an area about a plant, the depositing end of the applicator tube touching and concerning the hole in order to deposit fertilizer into the hole, the tank being supported by a means for supporting and portably transporting the tank to which means a ring is attached, which ring supports the applicator tube when the tube is not in use, the method for using the fertilizer root feeder by an operator comprising the steps of:

(a) strapping the tank of the fertilizer root feeder on an operator's back by the means for supporting and transporting the tank;

(b) holding the means for making a hole by the handle by an operator;

(c) positioning by an operator the piercing end on a ground area in order to make a hole in a desired location;

(d) positioning the shaft by an operator in order to make a hole at a desired angle;

(e) placing an operator's foot upon the foot rest;

(f) exerting sufficient pressure on the foot rest in order to pierce the ground area with the piercing end and make the hole in the ground at the desired location;

(g) disengaging the rigid applicator tube from the ring;

(h) positioning the applicator tube with the cut away portion facing upward and the bottom side of the depositing end touching and concerning the hole, such that the baffle is in a closed position;

(i) rotating the rigid applicator tube clockwise in order to initiate flow of the fertilizer from the tank through the hose extension and out the depositing end of the tube in order that fertilizer may be deposited within the hole;

(j) filling the hole with fertilizer;

(k) rotating the rigid applicator tube counterclockwise in order to cease flow of the fertilizer from the tank through the hose extension and out the depositing end of the tube in order that fertilizer may be deposited within the hole; and (l) moving to a new position among the plant roots to repeat steps (a) through (k) as many times as desired.

17. A portable fertilizing device for dispensing dry granular fertilizer comprising:

a tank; and a dispensing hose extension operatively connected to said tank, said dispensing hose extension including a rigid applicator tube having a depositing end; said depositing end of said tube having a cut-away portion defining a guide for directing a flow of dry granular fertilizer from said tube, said applicator tube having a baffle fixedly mounted in a fixed position relative to said applicator tube, approximate said depositing end for selectively retarding the flow of fertilizer from said tube upon rotational movement of said applicator tube.

18. The device of claim 17, wherein said baffle permanently blocks at least one half of a passageway of said applicator tube.

19. The device of claim 18, wherein said baffle is in a closed position when said guide is in a nine o'clock position with respect to a ground surface.

20. The device of claim 18, wherein said baffle is in an open position when said guide is in a six o'clock position with respect to a ground surface.

\* \* \* \* \*